Aug. 22, 1950      H. H. HENRY      2,520,005
GEAR SHIFT MEANS
Filed May 7, 1948
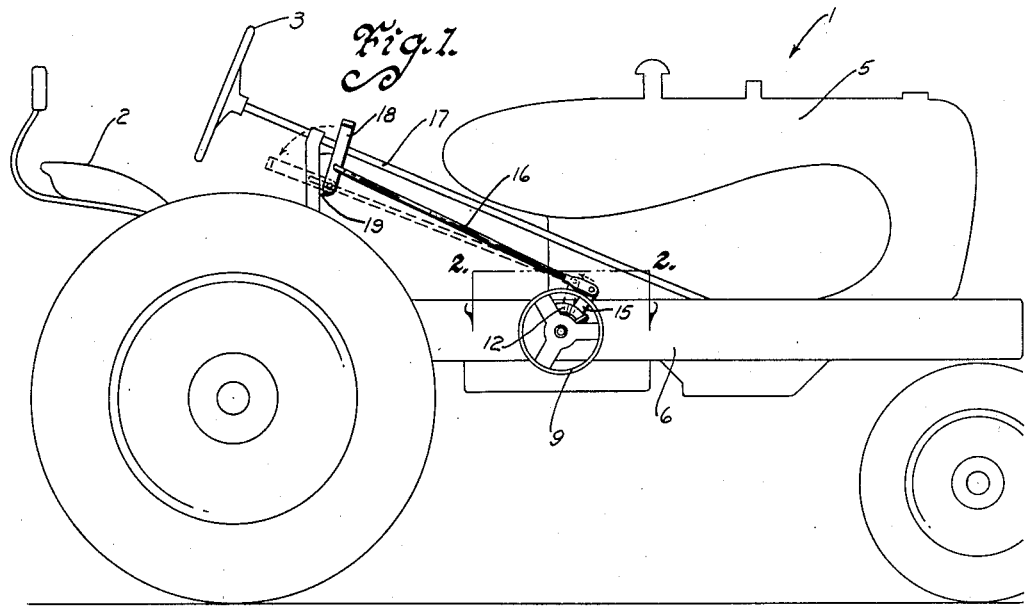
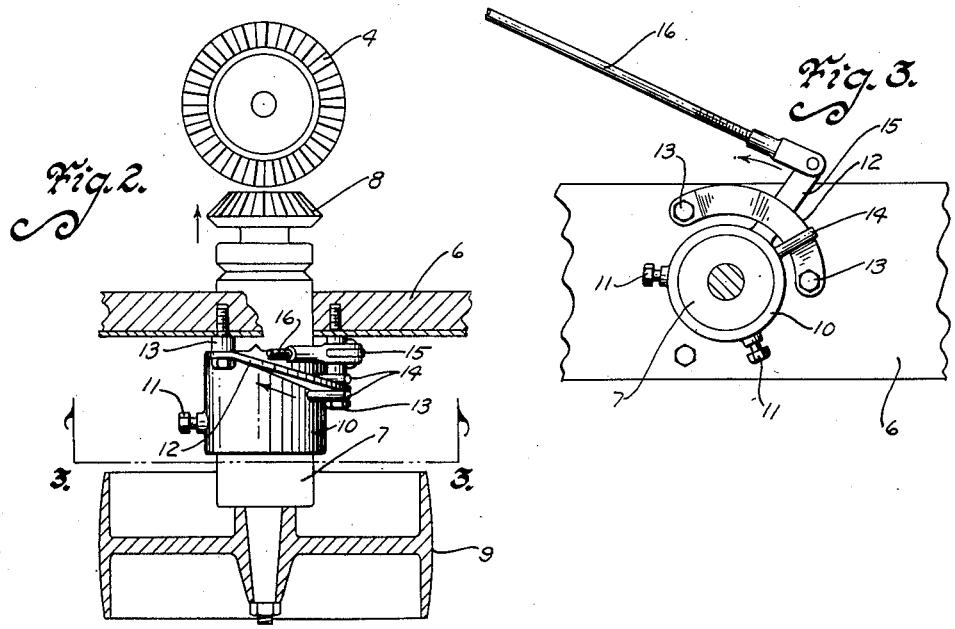
Inventor
Hubert H. Henry
by Harry L. Yinger
Attorney
Witness
Edward P. Seeley Patented Aug. 22, 1950

2,520,005

UNITED STATES PATENT OFFICE 2,520,005

GEARSHIFT MEANS

Hubert H. Henry, Bedford, Iowa

Application May 7, 1948, Serial No. 25,689

2 Claims. (Cl. 74—15.84)

This invention relates to a gear shifting means to mesh and unmesh gears attached respectively on a power take-off from a tractor with a sleeve carrying a belt pulley and more particularly to a gear shifting means that can be operated from a seat on the tractor.

It is an object of the invention among others to provide a gear shifting means mounted on a tractor frame and a sleeve carrying a belt pulley to mesh gears on a power take-off from a tractor and the sleeve from a driver's seat on the tractor.

It is a further object of the invention to provide a gear shifting means mounted on a tractor frame and a sleeve carrying a belt pulley wherein the sleeve is moved longitudinally to mesh gears on a power take-off from the tractor and the sleeve from a driver's seat on the tractor.

It is a still further object of the invention to provide a gear shifting means mounted on a tractor frame and a sleeve carrying a belt pulley that is simple in construction and operation, easy to operate and economical both in construction and operation; a starter mechanism that is long lasting and durable in operation, requiring less repair and lost time in operation; a gear shifting means that is easy to operate, simple in design and easy of repair in case of breakdown; a gear shifting means requiring no special skill to mount on a tractor; and a gear shift means that can be supplied at an economical price.

With the foregoing and other objects in view, the invention will be more fully described herewith and will be particularly pointed out in the claims appended hereto.

In the drawings wherein like symbols refer to like or corresponding parts throughout the several views:

Figure 1 is a perspective view of one side of a tractor showing the gear shifting means in place on the tractor.

Figure 2 is a sectional view taken through the line 2—2 of Figure 1 looking downwardly in the direction of the arrows.

Figure 3 is a sectional view taken through the line 3—3 of Figure 2.

The numeral 1 represents a farm tractor, which may be an Allis-Chalmers tractor of the W-C type with the tractor 1 having the usual driver's seat 2 with a steering wheel 3 being accessible to the driver from the seat 2.

Referring now to Figure 2, a gear 4 is shown that is on the end of a power take-off (not shown) that extends from the engine 5 of the tractor 1. The power take-off (not shown) and gear 4 are inside the tractor frame 6. A sleeve 7 having a gear 8 on the end thereof is rotatably mounted in the tractor frame 6 and is movable longitudinally on the tractor frame 6 to mesh gears 4 and 8 to rotate sleeve 7 with belt pulley 9 on the outer end thereof. In the past, the sleeve 7 and belt pulley 9 have been moved into meshing relationship or unmeshed relationship with gear 4 on the power take-off by hand. That is, the sleeve 7 is pushed in or out of the tractor frame 6 by grasping the sleeve 7 or belt pulley 9 and exerting the necessary force. The operator is forced to leave the tractor seat 2 in order to effect the shifting of the gears.

The present invention adds a second sleeve 10 over the first sleeve 7 with the second sleeve 10 being properly placed on the first sleeve 7 and then attached by screw 11 to the first sleeve 7. The first sleeve 7 and the second sleeve 10 then move as a unit. The second sleeve 10 is so placed on the first sleeve 7 that the gears 4 and 8 will mesh properly when the sleeves 7 and 10 are moved inwardly as far as they will go. The sleeve 10 is so mounted on the sleeve 7 that the sleeve 10 will abut against the tractor frame 6 when the gears 4 and 8 are properly meshed. The abutting of the sleeve 10 against the tractor frame 6 prevents the gear 8 from being forced against the gear 4 with too much force which would result in wear on the gears. The inner end of the sleeve 10 is notched so as to form a three point contact for the end of the sleeve 10 against the tractor frame 6. Grease and dirt collect on the frame 6 and if a full circular face contact of the sleeve 10 is had on the tractor frame 6, the dirt and grease may build up to the point that it limits the distance the sleeve 7 will extend through the frame 6 and thus the proper meshing of the gears 4 and 8. With point contact of the end of sleeve 10 with the tractor frame 6, the pointed ends of sleeve 10 will pierce the grease and dirt and insure that sleeve 10 will move the same distance each time it is actuated.

A helical track 12 is mounted by screws 13 to the tractor frame 6 and spaced pins 14 extend from the second sleeve 10 and receive the helical track 12 therebetween. A prong 15 extends upwardly from the second sleeve 10 and has a rod 16 pivotally attached to the prong 15. The prong 15 must be so spaced from the tractor frame 6 that it will allow the pins 14 to proceed to the end of the track 12 without binding of the prong 15 and track 12. The rod 16 extends rearwardly along the steering column 17. A handle 18 is pivotally attached to a supporting bracket 19 and has the end of rod 16 attached to the handle 18. The helical track 12 could also be a helical slot in a metal strap and the prong 15 could be made to move in the helical slot.

In operation, when the handle 18 is up, or in the full line position of Figure 1, the gears 4 and 8 are out of mesh, with the sleeves 7 and 10 and the pins 14 in the position with relation to the helical track 12 shown in Figure 2.

When it is desired to mesh the gears 4 and 8, the operator of the tractor 1 seated on the seat 2, grasps the handle 18 and pulls the handle backward to the dotted line position shown in Figure 1. The handle 18 and rod 16 practically align except that the handle 18 extends slightly beyond a perfect alignment to lock the rod 16 in the dotted position of Figure 1. With the rod 16 pulled to the left, the prong 15 is also pulled to the left and being rigidly attached to the sleeve 10, the sleeves 7 and 10 are also turned to the left. The sleeves 7 and 10 are guided in their rotation by the pins 14 and helical track 12 and are moved inwardly on the tractor frame 6 until gears 4 and 8 are brought into mesh. The belt pulley may have a belt placed thereon and the power take-off set into operation. To unmesh the gears 4 and 8 the handle 18 is lifted upwardly which brings the parts into the position of Figure 2 again.

It will be understood that the invention has been described for purposes of illustration and explanation and that changes and variations are possible without departing from the scope of the invention; all such modifications and changes are intended to be included in the appended claims.

I claim:

1. In combination, a tractor having a power take-off from the tractor engine and a gear on the end of the power take-off, a sleeve journalled in a frame of the tractor to be rotatable and longitudinally movable in the frame of the tractor, a gear on one end of the sleeve to mesh with the gear on the end of the power take-off, a belt pulley on the other end of the sleeve, a second sleeve surrounding and attached to the first sleeve to move therewith, a helical track attached to and extending outwardly from the tractor frame and a pair of radially extending portions spaced apart and extending outwardly from the second sleeve receiving the helical track therebetween which moves the sleeves forward upon rotation of the sleeves with the outer sleeve into engagement with the frame member to thus limit the movement of the gears into the proper mesh.

2. In combination, a tractor having a power take-off from the tractor engine and a gear on the end of the power take-off, a sleeve journaled in a frame of the tractor to be rotatable and longitudinally movable in the frame of the tractor, a gear on one end of the sleeve to mesh with the gear on the end of the power take-off, a belt pulley on the other end of the sleeve, a second sleeve surrounding and attached to the first sleeve to move therewith, a helical track attached to and extending outwardly from the tractor frame, a pair of radially extending portions spaced apart and extending outwardly from the second sleeve receiving the helical track therebetween which moves the sleeves forward upon rotation of the sleeves with the outer sleeve into engagement with the frame member to thus limit the movement gears into proper mesh and a prong extending from the second sleeve with a handle extending to a seat of a tractor to rotate the sleeves.

HUBERT H. HENRY.

REFERENCES CITED

The following references are of record in the file of this patent:

UNITED STATES PATENTS

| Number | Name | Date |
|---|---|---|
| 745,632 | Lecarme | Dec. 1, 1903 |
| 980,985 | Merriam | Jan. 10, 1911 |
| 1,469,249 | Clark | Oct. 2, 1923 |
| 1,566,924 | Robertson | Dec. 22, 1925 |
| 2,098,492 | Frudden | Nov. 9, 1937 |
| 2,169,333 | Zerk et al. | Aug. 15, 1939 |

FOREIGN PATENTS

| Number | Country | Date |
|---|---|---|
| 159,005 | Great Britain | Feb. 17, 1921 |
| 27,286 | France | May 31, 1924 |